Aug. 30, 1927.
V. S. K. PETERSEN
1,640,801
APPARATUS FOR MEASURING HEAT QUANTITIES
Filed July 15, 1919
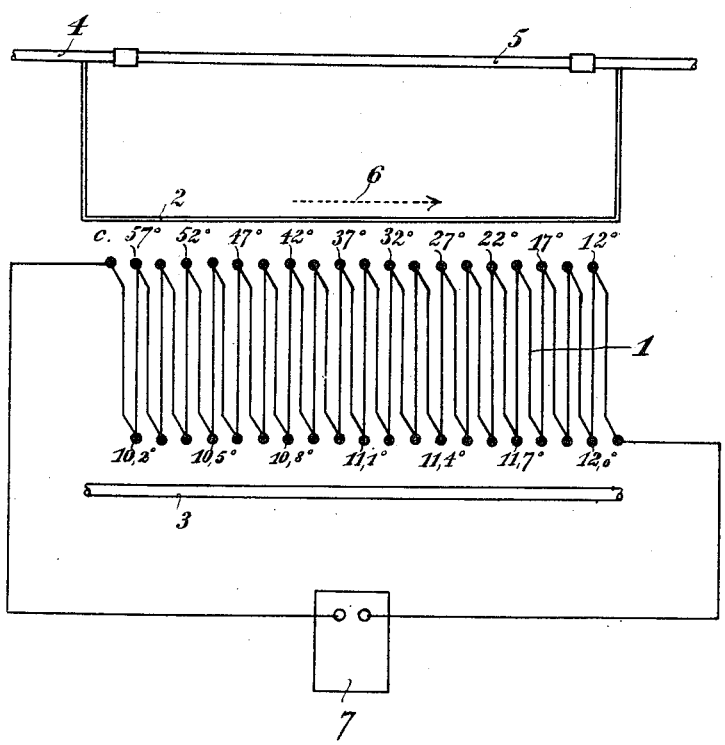
Inventor:
Viggo Stephen Kellner Petersen Patented Aug. 30, 1927.

1,640,801

UNITED STATES PATENT OFFICE.

VIGGO STEPHAN KELLNER PETERSEN, OF GJENTOFTE, NEAR COPENHAGEN, DENMARK.

APPARATUS FOR MEASURING HEAT QUANTITIES.

Application filed July 15, 1919, Serial No. 311,113, and in Denmark December 21, 1918.

The invention refers to measurement of heat consumption, and more especially the measurement according to my application Ser. No. 158,771, filed March 30th 1917, in which the induced electro-motive force of a thermopile, or the number of its active elements, is automatically altered by variations in the heat consumption. In the form of construction shown in Fig. 3 of my said prior application, the various elements in the thermopile are supposed to be subjected to uniform thermal conditions, and the problem is solved by the use of a mechanical contact apparatus, which cuts in or cuts out one or more of them.

According to my present invention the problem is solved in that, in proportion to the varying heat consumption, the very thermal conditions that the elements are subjected to are altered, namely by making it possible for the temperatures of the hot and cold joints, during slight heat-consumption, to approach each other more or less, with respect to a larger or smaller number of elements. According to circumstances, the surroundings of the hot joints may be deprived of more or less heat, or the cold joints can be supplied with more or less heat, or these steps may be combined. A certain region or a certain zone is produced, within which this heat-removal or heat-supply takes place, and, within this region or zone, the thermopile is placed, e. g. with the one pole at one end of it and the other pole at the other end. In order to avoid special heat or cold sources, if they are not conveniently accessible, the means for effecting the hot and cold joints, respectively, may be allowed to exchange temperature with each other, either by direct mixture of the hot and cold mediums, or by heat-conduction or heat-radiation, eventually with the thermo-elements themselves as heat-conductors or heat-radiators.

One form of construction in accordance with my present invention is diagrammatically shown in the drawing, by way of example.

1 is the thermopile, 2 designates the means for heating its joints, and 3 the means for cooling its cold joints.

The heating means 2 can be a shunt tube which issues from the hot-medium pipe 4, e. g. a steam-pipe or a hot-water pipe, and through which tube passes a certain fractional part of the heating medium passing through the pipe 4. To this end the pipe 4 may contain a pipe 5 of a fixed calibre. The cooling means or tube 3, can be a part of a cold-water pipe, or the like.

Owing to the exchange of heat between the means 2 and 3, which exchange may be effected in any suitable manner, like joints will have different temperatures at the various points on the thermopile. According to the construction shown in the drawing, where every second hot joint and every third cold joint is indicated by a designation of its temperature according to the centigrade scale, the temperature of the hot joints decreases rather rapidly in the direction of the dotted arrow 6, for instance from about 57° to about 12°, and the temperature of the cold joints increases slowly in the same direction, for instance from 10.2° to 12.0°. The diagram illustrates the conditionally chosen case, in which one of the elements,— the one farthest to the right,—is practically inactive. And from the given statements of temperature it appears that the activity of the other elements gradually decreases, the farther they lie to the right. If the heat medium in the tube 2 has a lesser speed or a lower temperature than that which corresponds to the shown condition, an effective temperature equalization will take place farther to the left in the thermopile, in which event more elements will be inactive, and the gradual decrease of the activity of the other elements will be, in a corresponding degree, greater. In this manner the strength of the thermo-current in the meter 7 will always correspond to the amount of heat at the time passing through the tube 2 per unit time, and when the conditions are properly adjusted,—the indications of the meter, for a certain period of time, will be a correct measurement of the heat quantities that, during the same period of time, are conducted through the pipe 4.

The even temperature transition from element to element, as assumed in the case shown in the drawing, is not essential to the invention. If the elements are unequally spaced apart, the temperature transition under otherwise uniform conditions from an element to the other will also be unequally great, and the same will be the case, if the conditions for the heat exchange are different for the different parts of the heat-exchange region. In this respect it may for instance be of moment, whether the cold medium moves in the same direction as the hot medium, or in the opposite direction. The heat-exchange in the example shown may result in a mean temperature, for instance, of about 35°. Furthermore, the heat-exchange does not need to be complete. All this principally depends upon the practical utilization of quantities of the one medium, in proportion to the other.

It is not necessary for the source of heat to be represented by the heat medium itself, the consumption of which is to be measured. They can consist of a gaseous, fluid, or solid medium whose temperature stands in a certain relation to that of the hot medium, owing to direct or indirect heating from the latter. The cold source can also be produced in several different ways.

I claim:

1. In an apparatus for measuring heat consumption, comprising a thermopile composed of a plurality of elements having hot and cold junctions of different temperatures, a conduit for the passage of the heating medium to be measured provided near the hot junctions, and a conduit for the passage of the cooling medium provided near the cool junctions.

2. The combination as set forth in claim 1, in which the elements of the said thermopile are so arranged as to effect the progressive equalization of the temperature in the lengthwise direction of the elements of the said thermopile.

3. An apparatus for measuring heat consumption, comprising a thermopile composed of a plurality of elements having hot and cold junctions of different temperatures, a conduit for the passage of the heating medium to be measured provided near the hot junctions, a conduit for the passage of the cooling medium provided near the cool junctions, and an electric meter connected with the two poles of said thermopile.

In testimony whereof I affix my signature.

VIGGO STEPHAN KELLNER PETERSEN.